United States Patent Office 3,551,403
Patented Dec. 29, 1970

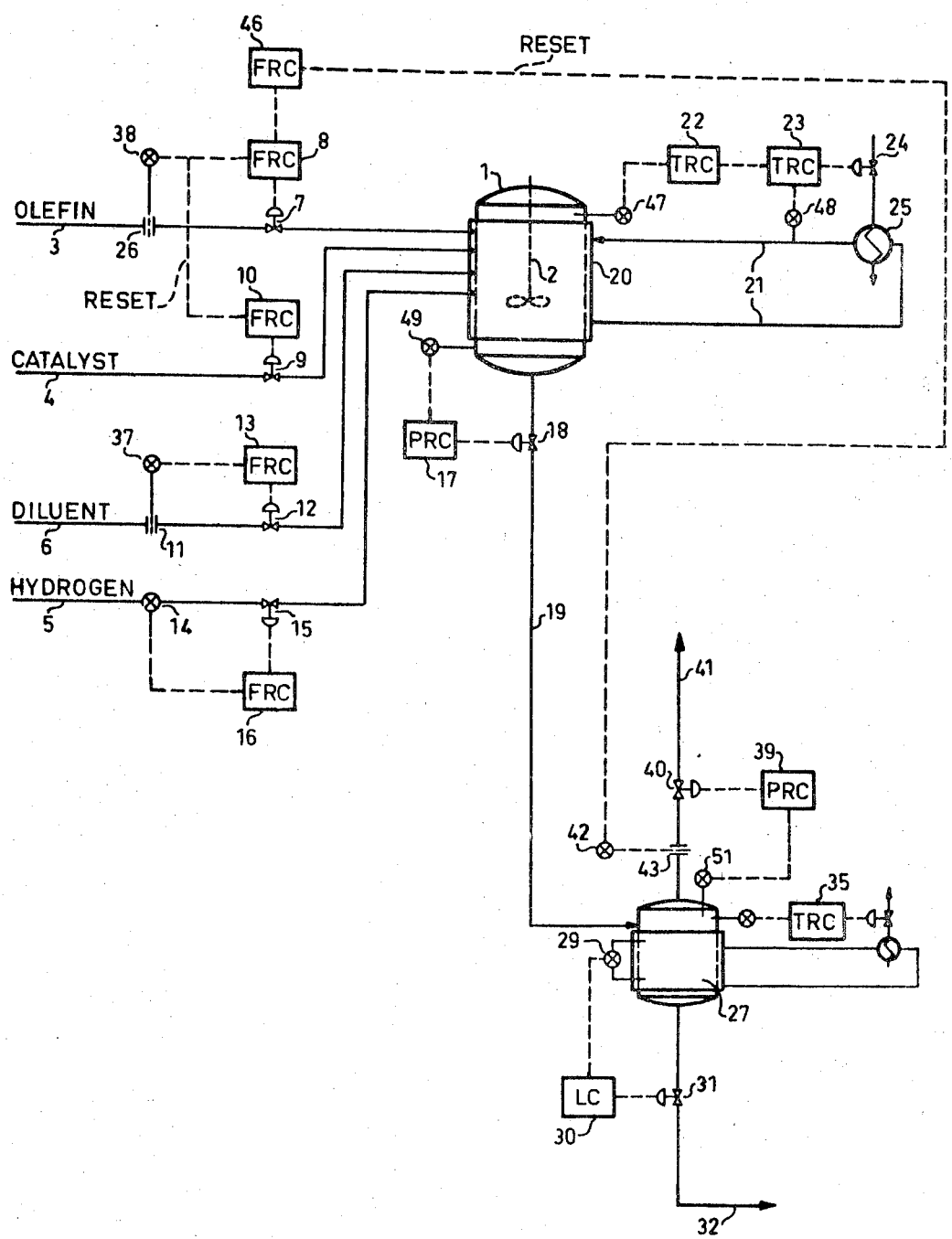

3,551,403
PROCESS FOR THE REGULATION OF THE POLYMERIZATION OF OLEFINS
André Delbouille and Alfred Hoffait, Brussels, Belgium, assignors to Solvay & Cie, Brussels, Belgium, a Belgian corporation
Filed Aug. 1, 1968, Ser. No. 749,442
Claims priority, application France, Aug. 1, 1967, 116,431
Int. Cl. C08d 3/04, 3/06, 3/08
U.S. Cl. 260—94.9
5 Claims

ABSTRACT OF THE DISCLOSURE

The process and device therefor concerns the regulation of the polymerization of gaseous olefins in a reactor operating continuously at a low pressure, and in the presence of a diluent, a polymerization catalyst and a chain transfer agent. The process which is carried out under constant conditions of temperature and pressure and with substantially constant concentrations is regulated by immediately adjusting the olefin input flow into the reactor in response to a variation in the gaseous output from the process and then adjusting the input flow of catalyst in the reactor to return the input flow of olefin to its initial value. The device includes a continuous type reactor, a separator communicating with the reactor, means for maintaining constant conditions in the reactor and separator and means for adjusting the concentrations of olefin and catalyst in the reactor in response to the gaseous outflow from the separator.

BACKGROUND OF THE INVENTION

The present invention is concerned with a process for regulating the low pressure polymerization of normally gaseous olefins in continuously operating reactors. The invention also relates to a device for carrying out this process.

There are well known processes for carrying out the low pressure polymerization olefins in a continuous manner, involving the use of an inert hydrocarbon solvent as the diluent. In these processes, a catalyst capable of polymerizing the olefins at low pressure and a chain transferred agent, such as hydrogen are also used.

In such processes, the molecular weight of the polymer produced, measured by the melt index thereof is dependent on the reaction temperature, the absolute concentration of olefin and of hydrogen in the reaction mixture, and mainly on the ratio of these concentrations. Under ideal continuous polymerization conditions, it is believed that it would be required only to maintain the flows of reactants and the temperature constant, to produce a uniform rate of polymerization and to obtain a polyolefin having a constant molecular weight.

However, even when constant conditions including constant flows of reactant, temperature and pressure have been established in continuous reactors, disturbances occur which upset the reaction conditions. In particular, the average activity of the catalyst in the polymerization reactor may be disturbed as a result of variations of the intrinsic activity of the catalyst, or as a result of the poisoning of the catalyst by impurities present in the solvent or in the reactants.

Disturbances of the activity of the catalyst modify the quantity of polymerized olefin and the concentration of olefin in the reactor, if samples or portions thereof are withdrawn regularly. This modification in turn has an influence on the relative concentration of olefin and hydrogen in the reactor and consequently, also effects the melt index of the polymers.

Accordingly, in continuous processes for the low pressure polymerization of olefin, reaction disturbances must be discontinued rapidly, otherwise, if allowed to continue uncorrected, the disturbances produce variations in the optimum reaction conditions which result in an unacceptable production and undesirable variations in the properties of the polymer. Therefore, the ability to stop disturbances in the preset optimum conditions immediately, in continuously operating polymerization reactors, is an important problem which must be solved in order to operate the reactors properly and efficiently and particularly, to produce a constant amount of polymerized product having uniform properties.

Further, the provision of a system for efficiently regulating and rapidly discontinuing disturbances occurring in continuously operating polymerization reactors is necessary in order to maintain optimum reaction conditions during the entire polymerization process.

To maintain a constant melt index of the polymer product, it is theoretically possible to adjust one or another of the hydrogen, olefin, and catalyst flows into the reactor, or even the temperature of the reaction mixture. As a first thought, it would seem obvious to adjust the input flow of the catalyst, since this would correct the initial cause of the disturbance, which is the variation of the activity of the catalyst in the polymerization reactors. However, it has been found that this adjustment produces only a relatively slow correction of the disturbances.

It is also possible to adjust the input flow of hydrogen into the reactors. However, such an adjustment results in a rather drastic change in the initially determined optimum conditions. It has also been found that the disturbances may be stopped more rapidly by modifying the input flow of the olefin. However, this last mentioned possibility causes the production to vary and reactor to operate under conditions which are not always optimum, which is a rather serious disadvantage.

SUMMARY OF THE INVENTION

The principal object of the present invention is the provision of a method and a device which effect the efficient regulation of low pressure polymerization of gaseous olefins in continuously operating reactors. Another object of the present invention is the provision of a method and device wherein disturbances occurring in the low pressure polymerization of gaseous olefins in continuously operating reactors are rapidly discontinued. Another object of the present invention is the provision of a method and device for regulating the low pressure polymerization of gaseous olefins in continuously operating reactors wherein the above mentioned disadvantages are overcome.

It has been found that the disturbances which occur in the continuous low pressure polymerization of olefins may be overcome by adjusting the flow of olefin entering the reactor, and by slowly and progressively controlling the flow of catalyst introduced into the reactor in order to restore the initial reaction conditions.

The present process concerns the regulation of polymerization of normally gaseous olefins in a reactor operating in a continuous manner, under low pressure, in the presence of a diluent, a polymerization catalyst and a chain transfer agent in order to produce olefinic polymers having a substantially uniform molecular weight at a substantially constant rate. According to the invention, the olefin and catalyst are introduced at a predetermined rate of flow into the reactor to effect a particular, predetermined concentration thereof; constant flows of the solvent and the chain transfer agent into the reactor are established; and constant conditions of temperature and pressure are maintained inside the reactor. A portion of the crude mixture is withdrawn from the reactor either continuously or at regular intervals; the portion of crude mixture is permitted to expand at a predetermined constant temperature and pressure; and the gaseous components which separate and are liberated from the expanded portion of crude mixture are measured. The input flow into the reactor is immediately adjusted as soon as there is a variation of gaseous output liberated by the expansion of the portion of crude material taken from the polymerization reactor, and thereafter the input flow of the catalyst into the reactor is progressively regulated in order to bring back the adjusted input flow of olefin to a predetermined given value.

It has been found that the present process may be carried out in a device which comprises a polymerization reactor adapted for continuous operation, a separator in communication with the polymerization reactor for separating the suspension of polymer in the diluent from the gaseous flow produced during the expansion of the crude reaction mixture flowing from the reactor, means to provide a constant temperature and pressure within the reactor and the separator, means to provide constant flows of the solvent and of the chain transfer agent into the reactor, means for measuring the gaseous outflow from the separator, means to adjust the input flow of olefin in the reactor with respect to the gaseous output flow coming from the separator, and means to regulate the quantity of catalyst introduced into the reactor so that the adjusted input flow of olefin in the reactor is progressively returned to a predetermined given value.

BRIEF DESCRIPTION OF THE DRAWING

The figure is a schematic representation or flow diagram of a device which may be used to carry out the process of the present invention.

DESCRIPTION OF THE PREFERRED EMBODIMENTS

This process may be used generally for the continuous polymerization of normally gaseous olefins, particularly ethylene, propylene, butene-1, pentene-1, 4-methyl pentene-1 and butadiene and for the copolymerization of these monomers with one another.

For example, the process of the present invention may be used to obtain polymers and copolymers in the form of solid particles, which are not dissolved in the inert diluent and which are produced by the polymerization of one or more olefins in the presence of any catalyst which is normally used in a low pressure polymerization process.

Examples of such catalysts are those containing a chromium oxide which is at least partially hexavalent, and is deposited on inert supports such as silica, alumina, and aluminum silicate. Other examples are the catalysts which may or may not be deposited on a support and are produced by the reaction of reducing compounds with compounds of the metals of Groups IV$b$ and VI$b$ of the Periodic Table. These last named catalysts may result from the combinations of diethylaluminum chloride or triisobutylaluminum with titanium tetrachloride, titanium trichloride or the complex of the general formula:

$$3TiCl_3—AlCl_3$$

Other catalysts which may also be used are the highly reactive catalysts deposited on a support, in particular those obtained by activating with an organometallic compound, preferably a trialkylaluminum or an alkylaluminum halide, the reaction product of a transition metal compound and a solid support comprising a hydroxy chloride of a divalent metal, in particular, magnesium hydroxychloride or an inorganic phosphate containing one or more hydroxyl groups bound to the molecule and/or water of crystallization. In this case, the transition metal compounds are selected from the group consisting of halides, alkoxy halides and alkoxides of the metals of Groups IV$b$, V$b$ and VI$b$ of the Periodic Table, more particularly, the titanium and vanadium derivatives such as $TiCl_4$, $Ti(OC_2H_5)_4$, $Ti(OC_2H_5)_3Cl$, $VOCl_3$, $VCl_5$ or $VO(OC_4H_9)_3$.

The above list of catalysts should not be limited to those specifically mentioned and it is understood that any other catalyst comprised within the above groups may be used to regulate the low pressure polymerization of olefins.

The polymerization is carried out in the presence of a liquid hydrocarbon diluent which should be inert under the polymerization conditions.

Examples of suitable diluents are the paraffinic hydrocarbons such as those containing from 3 to 8 carbon atoms per molecule such as, n-butane, isobutane, n-pentane, isopentane, hexane, heptane and the saturated cyclic hydrocarbons such as cyclohexane, cyclopentane and methylcyclohexane.

A particularly suitable diluent which may be used in some cases, is the monomer itself if it is liquid under the operating conditions.

The chain transfer agent used for regulating the molecular weight of the polymer is selected from those well known in the art. It may be liquid or gaseous. If it is a gas, a portion thereof will be found with the olefin in the gaseous flow at the output of the polymerization apparatus. The flow thereof will define a constant addition to the variable flow of unpolymerized olefin. This additional flow is not detrimental to the operation of the regulating device which is only dependent on the variations of the gaseous output flow but not on the absolute value of this flow.

The preferred transfer agent in the process according to the invention is hydrogen.

The polymerization reactor used for the present process does not require specific characteristics, it may be of any type as long as it can be operated continuously. However, it is preferred to use a reactor which is completely filled with a liquid; otherwise there would be a slowing down of the disturbances in the gaseous output flow as a result of a gaseous phase present in the reactor. It is recommended that a closed circuit reactor operating continuously be used, though this is not indispensable.

The various devices and regulating means used in the system of the invention are of the types which are used in similar installations and are well known in the art.

The process and device of the present invention will be further described with reference to the single figure of the drawing which is a diagrammatic view of a reactor according the the invention.

Referring now to the drawing, a polymerization reactor 1 is provided with a stirrer 2 to assure a good stirring or mixing of the reaction mixture therein. During operation, the reactor is completely filled with a liquid and operates with a total absence of a gaseous phase. Any gas present therein is dissolved in a diluent provided as hereinafter explained. The reactor is supplied with olefin feed through a conduit 3 and a catalyst through a conduit 4, a diluent through a conduit 6 and a transfer agent, for example hydrogen, through a conduit 5.

It is preferred to supply the olefin substantially at a constant rate and temperature. The rate is controlled by an olefin flow control valve 7 under control of a rate of flow controller 8 actuated by a pressure drop across a diaphragm orifice 26 which transmits a control signal to a transmitter 38 which applies a signal to the controller 8. The rate of feed or flow of olefin into the reactor is modified in dependence upon variations of a flow of a gaseous output flow escaping from a separator as hereinafter later described. The regulating system produces as explained hereinafter a fast discontinuation of the various disturbances which cause a variation of the flow of the gaseous output. The output of the apparatus comprises the unpolymerized olefin, the transfer agent and diluent vapors as later described.

A catalyst is introduced into the reactor, while in a suspension in the polymerization diluent, through the conduit 4 provided with a catalyst flow control valve 9 operated or manipulated by a rate of flow controller or regulator 10 receptive of the signal from the transmitter 38 through a reset connection as illustrated. The catalyst supply is controlled so that the flow of olefin under control of the pressure drop across the orifice 26 is progressively brought back to a fixed controlled value which is determined so as to obtain a given production and in order to arrive at the optimum operating conditions of the reactor.

The flow of diluent supplied to the polymerization reactor 1 through the conduit 6 is maintained constant by a flow rate controller 13 activated in response to a pressure drop across a diaphragm orifice 11. A control valve 12 in the line 6 is manipulated under control of the constant flow rate controller 13 responding to a control signal from the diaphragm orifice pressure differential transmitted through a transmitter 37.

The flow of chain transfer agent supplied to the reactor through the conduit 5 is maintained constant. In order to accomplish this a sensing device 14 measures or senses the flow of the hydrogen through the conduit and a transfer agent flow control valve 15 in the conduit is manipulated by a flow rate controller 16 in response to the measurement of the measuring device 14.

Portions of the crude suspension containing the polymer, the unpolymerized olefin, the chain transfer agent and the diluent are continuously taken from the reactor through a line or conduit 19. A control valve 18 in this line 19 is manipulated under control of a pressure-controlled pressure controller 17 which maintains the pressure within the polymerization reactor constant by controlling the manipulation of the control valve 18 in response to a signal or measurement from a sensor or receiver 49 connected to the interior of the reactor 1 for measuring or sensing the pressure therein. The crude suspension taken from the reactor is supplied by the line 19 to a separator 27 in which conditions are such that the temperature and pressure within which expansion takes place are maintained constant by means of pressure and temperature regulators hereinafter described.

In order to maintain the reaction in the reactor 1 at a desired temperature, the reactor is provided with a double cooling jacket 20 through which a cooling medium, for example cooling water, is supplied through a closed circuit 21. The temperature within the reactor is sensed by a temperature sensor or measuring device 47 and the measurement thereof is applied to a temperature-recording controller 22. The temperature of the cooling medium in the cooling circuit 21 is sensed by a sensor 48 which applies its output or measurement signal to a second temperature recording controller or regulator 23 which is likewise responsive to the other temperature recording controller 22. The second controller 23 adjusts a valve 24 which regulates the rate of flow of water supplied to a heat exchanger 25 cooling the water in the closed circuit 21. The temperature regulating system comprising the two temperatures recording controllers is arranged to maintain a constant temperature in the reaction mixture within the reactor.

The level of the crude suspension received in the separator 27 is regulated by means of a regulating system comprising level sensing means 29 which applies a signal to a level controller or regulator 30 activating a control valve 31 varying its opening as needed to control outflow of degasified polymer suspension from the separator through a discharge line or conduit 32 which delivers its output to a device, not shown, for separating the polymer from the suspension.

The temperature of the liquid within the separator is regulated and maintained constant by a temperature regulating system 35 somewhat similar to that of the reactor. This temperature regulating system comprises a temperature sensor sensing the temperature within the separator and applying its measurement to a temperature recording controller operating a control valve for varying the cooling water flow to a heat exchanger removing heat from water within a closed cooling circuit including a double jacket on the separator 27 in the manner heretofore described with respect to the cooling system of the reactor 1.

Within the separator degasification of the crude suspension taken from the reactor 1 takes place by expansion. A gaseous output or flow from the separator takes place to atmosphere, or elsewhere if desired, and escapes through a conduit 41 under control of a pressure controller or regulator 39 which controls the outflow, by manipulating a control valve 40 connected in the outflow conduit 41, as a function of the pressure within the separator 27 which is measured or sensed by a sensor or receiver 51 which applies its measurement to the pressure controller 39. The pressure controller adjusts the pressure control valve 40 to maintain the pressure within the separator constant.

As heretofore described, the olefin flow rate controller 8 controlling the flow or supply of the olefin modifies the flow of olefin at the input side of the reactor in dependence upon variations of the flow of the gaseous output escaping from the separator through the line 41. In order to accomplish this a transmitter 42 transmits a signal in response to a pressure drop across a diaphragm orifice 43 in the line 41 and applies its output signal to a flow rate controller 46 which modifies the action of the first-mentioned flow rate controller 8 through a reset line or connection between the modification flow rate controller and the transmitter 42.

EXAMPLES 1-4

In an apparatus such as the one illustrated in the drawing, the polymerization of ethylene was carried out continuously, under a low pressure and under various regulating conditions.

Hexane is used as the diluent, hydrogen is the transfer agent and the catalyst is the reaction product between $Mg(OH)Cl$ and $TiCl_4$ as described in Belgian Pat. No. 650,679, which has been activated by means of triisobutylaluminum.

The polymerization reactor has a capacity of 200 liters.

Example 1 in Table 1 which follows, gives ideal polymerization conditions in the absence of disturbances.

Examples 2, 3 and 4 illustrate the effect of disturbances resulting from variations of the activity of the catalyst or from the poisoning thereof due to the impurities contained in the diluent or in the reactants.

In Example 2, the polymerization is carried out without making corrections for the input flows of ethylene and catalyst which are maintained constant during the entire polymerization process.

Under these conditions, it has been observed that by slowing down the polymerization yield, there is an increase of the concentration of ethylene within the reactor, from 3 to 3.72 g./l., accompanied by a decrease of the melt index of the polymer and an increase of its molecular weight.

As a consequence, a decrease of the activity of the catalyst causes a decrease of the quantity and a modification of the quality of the resulting polyethylene, due to an increase of its molecular weight.

In Example 3, the polymerization is carried out by modifying the input flow of ethylene with respect to the output flow of the gaseous effluent while maintaining a constant flow of the catalyst during the entire operation.

A decrease of the activity of the catalyst causes a decrease of the yield of the polymerization and therefore an increase of the concentration of ethylene in the reactor.

This increase of the concentration of ethylene is determined by measuring the increasing flow of the gaseous effluent by means of the diaphragm 43.

The regulator 46, which receives the measure of the flow of the gaseous effluent in the form of a standard signal emitted by the transmitter 42, by means of the regulator 8 causes a decrease to 5.55 kg./hr. of the flow of ethylene at the input of the reactor. The regulator 46 is therefore capable of maintaining a constant concentration of ethylene within the reactor at 3 g./l., to produce polymers having uniform molecular weights.

However, the decrease of the flow of ethylene at the input of the reactor causes a decrease of the production of polymer, from 6.75 to 5.4 kg./hr., and a modification of the operating conditions of the reactor which is no longer operating under the initially established optimum conditions.

In Example 4, the polymerization is carried out by using the regulating system according to the invention. The effect of the disturbance shown by an increase of the flow of the gaseous effluent is rapidly corrected by decreasing the flow of ethylene at the input so that the ethylene concentration in the reactor is reset to 3 g./l. of hexane. Thus, it is possible to obtain polymers having a constant melt index and consequently, a constant molecular weight. The initial value of the production of polyethylene is again set at 6.75 kg./hr. by slowly and progressively increasing the flow of catalyst at the input of the reactor from 6 to 7.5 g./h. so as to bring the input flow of ethylene up to a controlled predetermined value of 6.9 kg./hr.

Table 1, which follows describes the various polymerization conditions, after the appearance of the disturbance which reduces the activity of the catalyst, and the operation of the regulating system.

The values given for Examples 2, 3 and 4 should be compared to those of Example 1 which give the optimum conditions of operation of the reactor.

TABLE 1

| Conditions | Examples | | | |
|---|---|---|---|---|
| | 1 | 2 | 3 | 4 |
| Flow of ethylene, kg./hour | 6.9 | 6.9 | 5.55 | 6.9 |
| Flow of hexane, l/hour | 50 | 50 | 50 | 50 |
| Flow of catalyst, g./hour | 6 | 6 | 6 | 7.5 |
| Temperature of reactor, °C | 80 | 80 | 80 | 80 |
| Pressure in reactor, kg./cm.² | 30 | 30 | 30 | 30 |
| Hourly production of polyethylene, kg./hour. | 6.75 | 6.71 | 5.4 | 6.75 |
| Density of suspension in operation, kg. PE/l of hexane. | 0.135 | 0.134 | 0.108 | 0.134 |
| Flow of hydrogen, g./hour | 5 | 5 | 5 | 5 |
| Hydrogen concentration, g./l. of hexane | 0.1 | 0.1 | 0.1 | 0.1 |
| Ethylene concentration, g./l. of hexane | 3 | 3.72 | 3 | 3 |
| Melt index (ASTM D 1238-57 T), g./10 minutes. | 10 | 6.5 | 10 | 10 |
| Conditions of expansion in separator: | | | | |
| Temperature, °C | 60 | 60 | 60 | 60 |
| Pressure, kg.ª/cm.² | 1.2 | 1.2 | 1.2 | 1.2 |
| Output flow of gaseous effluent, l/hour | 417 | 494 | 417 | 417 |
| Composition of gaseous effluent, percent: | | | | |
| Ethylene | 22 | 24 | 22 | 22 |
| Hydrogen | 14 | 11.5 | 14 | 14 |
| Hexane | 64 | 64.5 | 64 | 64 |

Although specific embodiments of this invention have just been described, it is understood that modifications are permissible according to the invention, the scope of which is to be determined from the appended claims only.

What we claim and desire to secure by Letters Patent is:

1. Process for regulating the polymerization and copolymerization of normally gaseous olefins in a reactor continuously at a low pressure, and in the presence of a diluent, a polymerization catalyst and hydrogen as a chain transfer agent, to produce a substantially constant amount of olefinic polymer having a substantially uniform molecular weight, which comprises introducing said olefin and said catalyst into said reactor at predetermined rates of flow, establishing constant flows of said diluent and said chain transfer agent into said reactor, maintaining constant conditions of temperature and pressure of the mixture inside said reactor, withdrawing a portion of the crude mixture from said reactor, permitting said portion of crude mixture to expand under a predetermined constant temperature and pressure, measuring the flow of the gaseous components which separate from said portion of said crude mixture, said gaseous components including hydrogen and unpolymerized olefin, immediately adjusting the input flow of said olefin into said reactor in response to a variation in the amount of gaseous flow, said input flow of said olefin being increased in response to a decrease in said gaseous flow and being decreased in a response to an increase in said gaseous flow in an amount sufficient to bring said amount of gaseous flow to the original value, and then regulating the input flow of said catalyst in response to the input flow of said olefin into said reactor in order to progressively return the olefin input flow in said reactor to said predetermined value said input flow of said catalyst being increased in response to a decrease in said olefin input flow and being decreased in response to an increase in said olefin input in an amount sufficient to bring said olefin input to said predetermined rate of flow.

2. A process according to claim 1, in which said portion of crude mixture is continuously withdrawn from said reactor and in which said gaseous components are continuously measured.

3. Process according to claim 1 in which said olefin is selected from at least one member of the group which consists of ethylene and propylene.

4. Process according to claim 1 in which said olefin is ethylene.

5. Process for regulating the polymerization and copolymerization of olefins selected from at least one member of the group consisting of ethylene, propylene, butene-1, pentene-1, 4 methylpentene-1 and butadiene in a reactor continuously at low pressure, and in the presence of a diluent, a polymerization catalyst and hydrogen as a chain transfer agent, to produce a substantially constant amount of olefinic polymer having a substantially uniform molecular weight, which comprises introducing said olefin and said catalyst into said reactor at predetermined rates of flow, establishing constant flows of said diluent and said chain transfer agent into said reactor, maintaining constant conditions of temperature and pressure of the mixture inside said reactor, withdrawing a portion of the crude mixture from said reactor, permitting said portion of crude mixture to expand under a predetermined constant temperature and pressure, measuring the flow of the gaseous components which separate from said portion of said crude mixture, said gaseous components including hydrogen and unpolymerized olefin, immediately adjusting the input flow of said olefin into said reactor in response to a variation in the amount of gaseous flow, said input flow of said olefin being increased in response to a decrease in said gaseous flow and being decreased in a response to an increase in said gaseous flow in an amount sufficient to bring said amount of gaseous flow to the original value, and then regulating the input flow of said catalyst into said reactor in order to progressively the olefin input in said reactor to said predetermined rate of flow, said input flow of said catalyst being increased in response to a decrease in said olefin input flow and being decreased in response to an increase in said olefin input in an amount sufficient to bring said olefin input to said predetermined rate of flow.

References Cited

UNITED STATES PATENTS 3,130,187 4/1964 Tolin et al. _____ 260—94.9
3,356,667 12/1967 Smith et al. _____ 260—93.7

JOSEPH L. SCHOFER, Primary Examiner
W. F. HAMROCK, Assistant Examiner

U.S. Cl. X.R.

260—85.3, 88.2, 93.7, 94.2, 94.3, 95